(12) United States Patent
Huang

(10) Patent No.: US 9,333,628 B2
(45) Date of Patent: May 10, 2016

(54) DRIVING END OF TOOL

(71) Applicant: New Way Tools Co., Ltd., Taichung (TW)

(72) Inventor: Ping-Wen Huang, Taichung (TW)

(73) Assignee: New Way Tools Co., Ltd., Taichung (TW)

(*) Notice: Subject to any disclaimer, the term of this patent is extended or adjusted under 35 U.S.C. 154(b) by 70 days.

(21) Appl. No.: 14/042,769

(22) Filed: Oct. 1, 2013

(65) Prior Publication Data
US 2014/0020518 A1 Jan. 23, 2014

Related U.S. Application Data

(63) Continuation-in-part of application No. 13/678,661, filed on Nov. 16, 2012, now Pat. No. 9,115,773.

(30) Foreign Application Priority Data

Aug. 30, 2013 (TW) .............................. 102131322 U

(51) Int. Cl.
*B25B 13/46* (2006.01)
*B25B 17/02* (2006.01)
*F16D 41/16* (2006.01)
*B25B 23/00* (2006.01)

(52) U.S. Cl.
CPC ............. *B25B 13/463* (2013.01); *B25B 13/462* (2013.01); *B25B 13/467* (2013.01); *B25B 17/02* (2013.01); *F16D 41/16* (2013.01); *B25B 23/0035* (2013.01)

(58) Field of Classification Search
CPC .. B25B 13/463; B25B 13/467; B25B 13/462; B25B 17/00; B25B 17/02
See application file for complete search history.

(56) References Cited

U.S. PATENT DOCUMENTS

| 417,829 | A |   | 12/1889 | Lowell |  |
|---|---|---|---|---|---|
| 471,765 | A | * | 3/1892 | Wever et al. | ............... 81/62 |
| 919,260 | A | * | 4/1909 | Smith | ............ 81/57.46 |
| 2,603,976 | A |   | 7/1952 | Hilton |  |
| 2,680,983 | A | * | 6/1954 | Miller | ........... B25B 13/465 |
|  |  |  |  |  | 81/57.3 |
| 3,175,433 | A | * | 3/1965 | Akers, Jr. | ............ 81/57.22 |
| 3,828,629 | A |   | 8/1974 | Moore |  |
| 3,983,759 | A |   | 10/1976 | Linden |  |
| 4,420,995 | A |   | 12/1983 | Roberts |  |
| 6,112,621 | A | * | 9/2000 | Ochiai | .......... 81/57.29 |
| 6,257,097 | B1 | * | 7/2001 | I-He | ............ B25B 13/467 |
|  |  |  |  |  | 81/57.3 |
| 6,260,448 | B1 |   | 7/2001 | Chaconas |  |

(Continued)

FOREIGN PATENT DOCUMENTS

| AT | 368055 B | 9/1982 |
|---|---|---|
| CN | 1263808 A | 8/2000 |

(Continued)

*Primary Examiner* — Bryan R Muller
(74) *Attorney, Agent, or Firm* — Alan D. Kamrath; Kamrath IP Lawfirm, P.A.

(57) ABSTRACT

A driving end of a tool includes a body including a chamber. A first engaging member is rotatably disposed in the chamber and defines a first engaging section. A second engaging member is rotatably disposed in the chamber and defines first and second engaging ends. The first engaging section is engaged with the first engaging end. At least one pawl is slidably disposed in the chamber and defines a first engaging portion. The second engaging end is selectively engaged with the first engaging portion. A switch is pivotally engaged with the body and abutted against the at least one pawl.

17 Claims, 17 Drawing Sheets

(56) References Cited

U.S. PATENT DOCUMENTS

| | | | |
|---|---|---|---|
| 7,032,478 B2 | 4/2006 | Hu | |
| 7,089,830 B2 * | 8/2006 | Hu | 81/63.1 |
| 7,938,043 B2 * | 5/2011 | Hu | 81/63.2 |
| 8,375,830 B1 * | 2/2013 | Yang | 81/60 |
| 8,763,498 B2 | 7/2014 | Hsieh | |
| 2005/0247167 A1 | 11/2005 | Chaconas et al. | |
| 2007/0277652 A1 | 12/2007 | Tuan-Mu | |
| 2008/0245194 A1 | 10/2008 | Ross et al. | |
| 2009/0007731 A1 | 1/2009 | Chen | |
| 2013/0276593 A1 * | 10/2013 | Yang | 81/60 |
| 2014/0020518 A1 | 1/2014 | Huang | |

FOREIGN PATENT DOCUMENTS

| | | |
|---|---|---|
| CN | 1575930 A | 2/2005 |
| TW | 459593 U | 10/2001 |

\* cited by examiner

US 9,333,628 B2

DRIVING END OF TOOL

CROSS REFERENCE

The present application is a continuation-in-part application of U.S. patent application Ser. No. 13/678,661, filed on Nov. 16, 2012.

BACKGROUND OF THE INVENTION

1. Field of the Invention

The present invention relates to a driving end of a tool and, in particular, to a driving end of a tool that a user can operably move through a small angle to drive an object engaged therewith, and which has a simple structure and is able to withstand high torque transmission.

2. Description of the Related Art

TW Patent No. 459593 shows a structurally improved wrench. The wrench includes a driving end including a chamber. A gear wheel is disposed in the chamber. A receiving slot is disposed adjacent the chamber. A pivot shaft is disposed in the receiving slot and includes a gear pivotally engaged therewith. The gear is engaged with the gear wheel. A shaft with a plurality of teeth is engaged with the gear and the gear wheel. A control mechanism is received in the receiving slot to control the direction of rotation of the gear wheel. The control mechanism includes a pawl to engage with the gear wheel.

It is still desirable to improve the mechanism set forth in order to provide a wrench that is able to withstand high torque transmission.

The present invention is, therefore, intended to obviate or at least alleviate the problems encountered in the prior art.

SUMMARY OF THE INVENTION

According to the present invention, a driving end of a tool includes a body including a chamber. The chamber defines first and second sectional areas. A first engaging member is rotatably disposed in the first sectional area and includes two different ends defining a first engaging section. The first engaging section extends circumferentially on an outer periphery of the first engaging member and includes a plurality of teeth. The second section engages with an object to be driven by the driving end of the tool. A second engaging member is rotatably disposed in the second sectional area and includes two different ends defining first and second engaging ends. The first engaging section is engaged with the first engaging end. The first engaging end extends circumferentially on an outer periphery of a first end of the second engaging member and includes a plurality of teeth. The second engaging end extends circumferentially on an outer periphery of a second end of the second engaging member and includes a plurality of teeth. At least one pawl is slidably disposed in the second sectional area and defines a first engaging portion including a plurality of teeth. The second engaging end is selectively engaged with the first engaging portion. A switch is pivotally engaged with the body and abutted against the at least one pawl.

It is an objective of the present invention to provide a driving end of a tool with a simple structure, but which is able to withstand high torque transmission.

It is another objective of the present invention to provide a driving end of a tool that a user can operably move through a small angle to drive an object engaged therewith..

Other objectives, advantages, and new features of the present invention will become apparent from the following detailed description of the invention when considered in conjunction with the accompanied drawings.

DETAILED DESCRIPTION OF THE INVENTION

Figure 1:
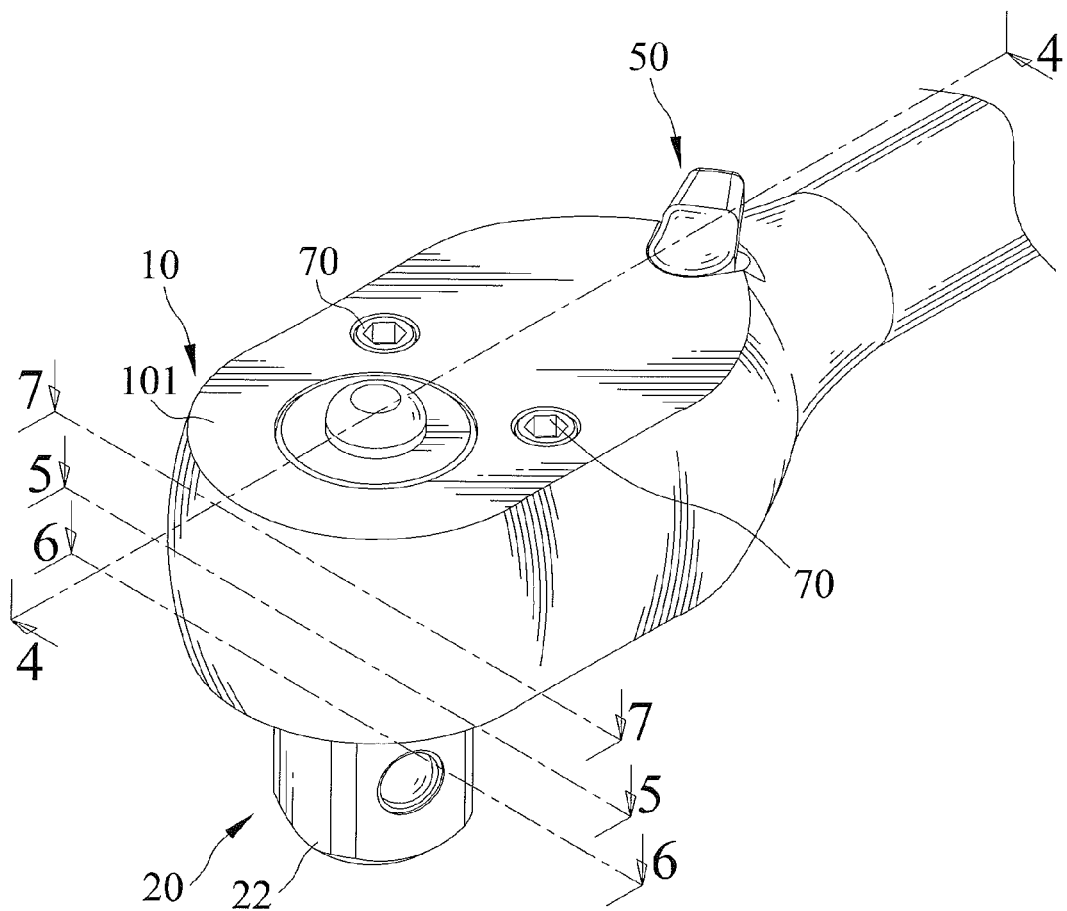
FIG. 1 is a perspective view of a driving end of a tool in accordance with a first embodiment of the present invention.
Figure 2:
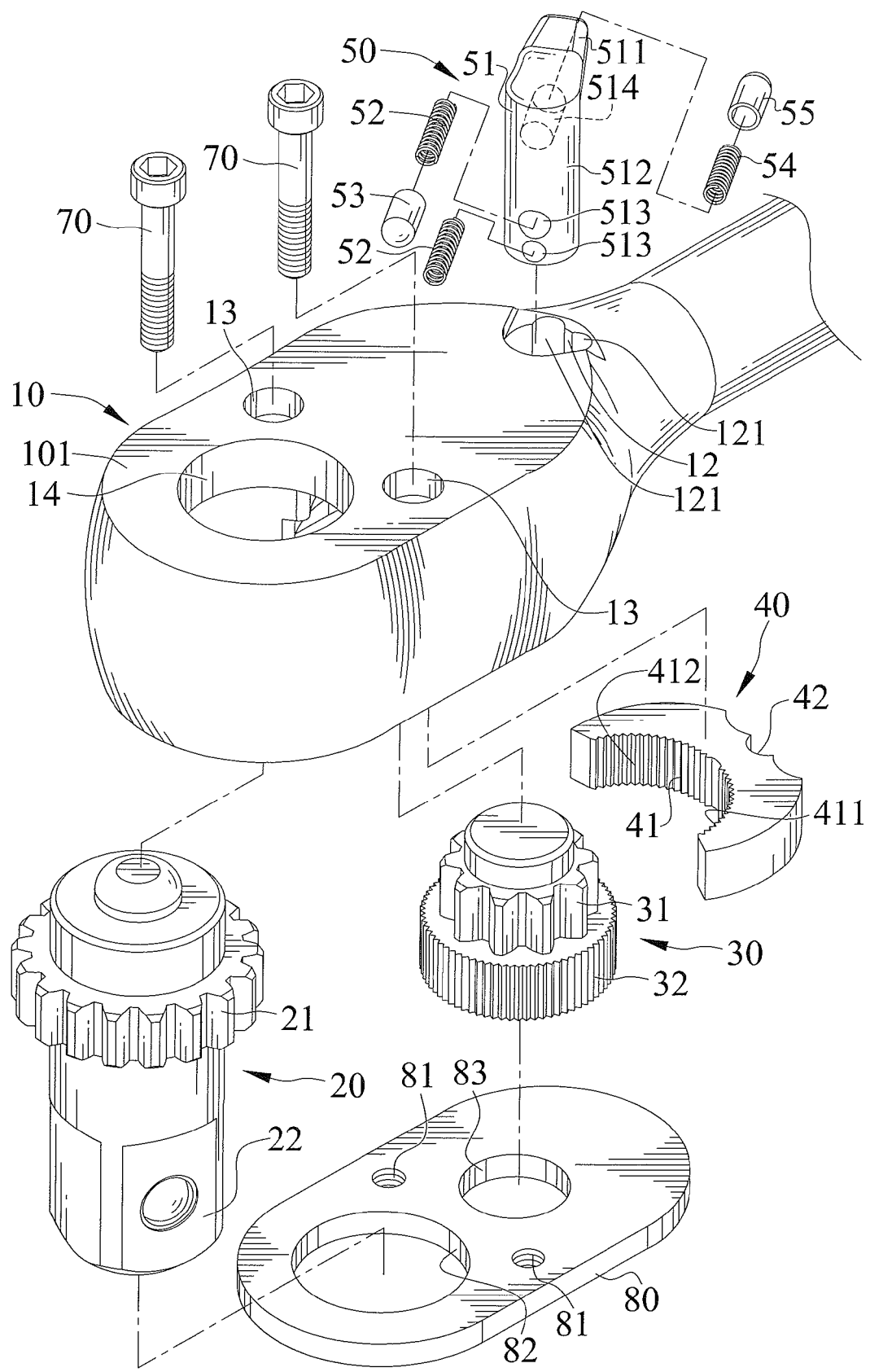
FIG. 2 is an exploded perspective view of the driving end of the tool shown in FIG. 1.
Figure 3:
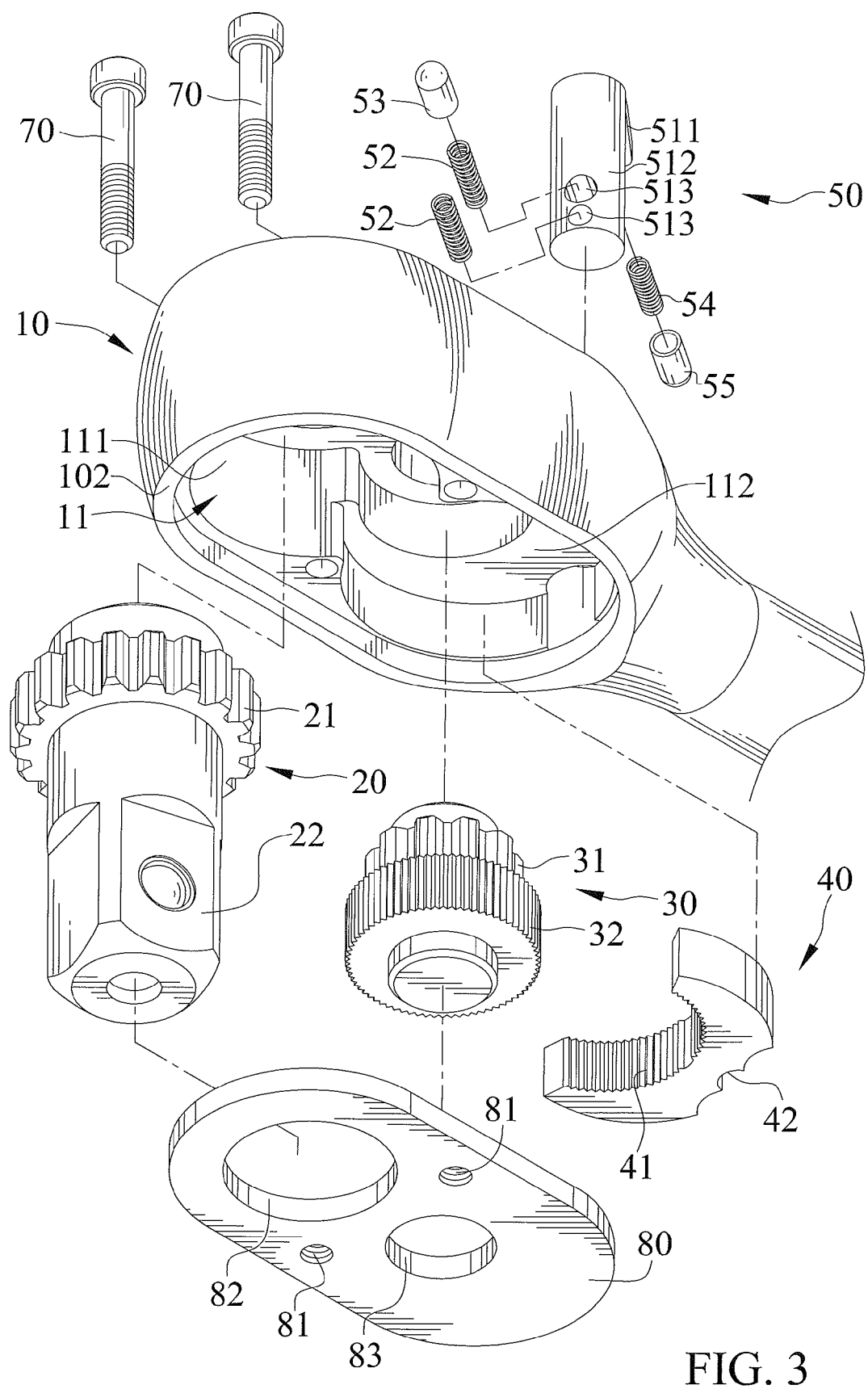
FIG. 3 is another exploded perspective view of the driving end of the tool shown in FIG. 1, taken from a different angle than FIG. 2.
Figure 4:
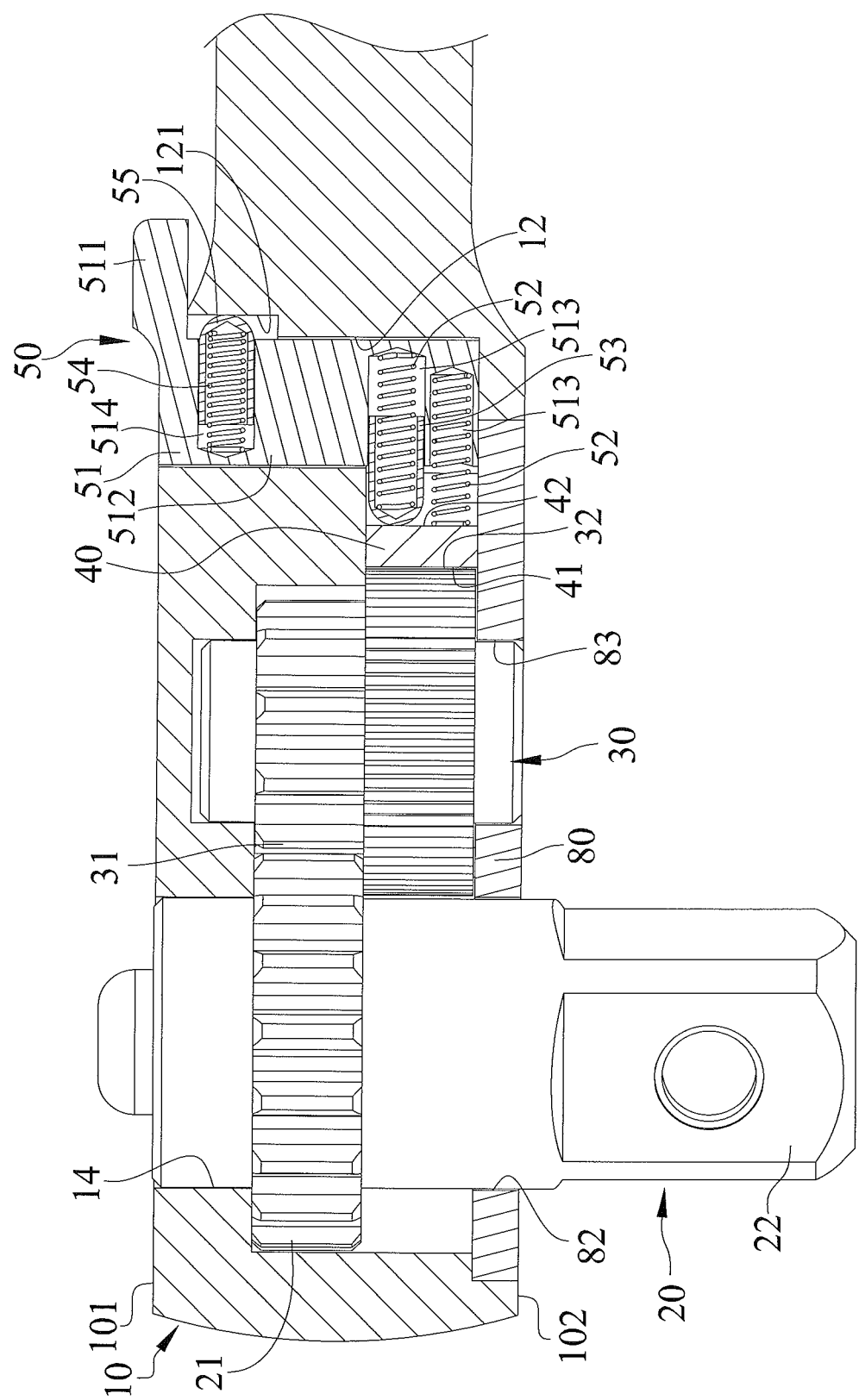
FIG. 4 is a cross-sectional view taken along line 4-4 of FIG. 1.
Figure 5:
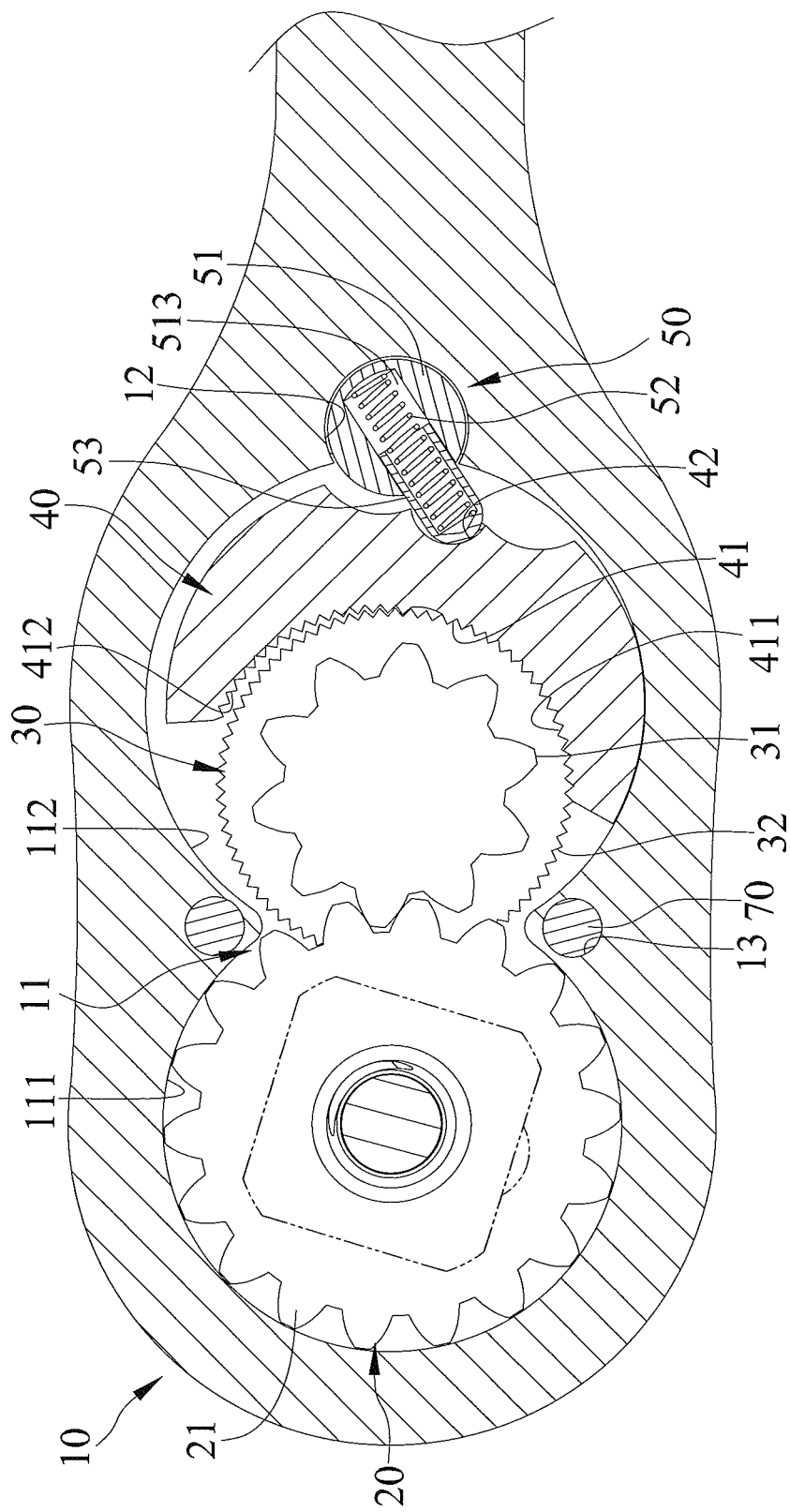
FIG. 5 is a cross-sectional view taken along line 5-5 of FIG. 1.
Figure 6:
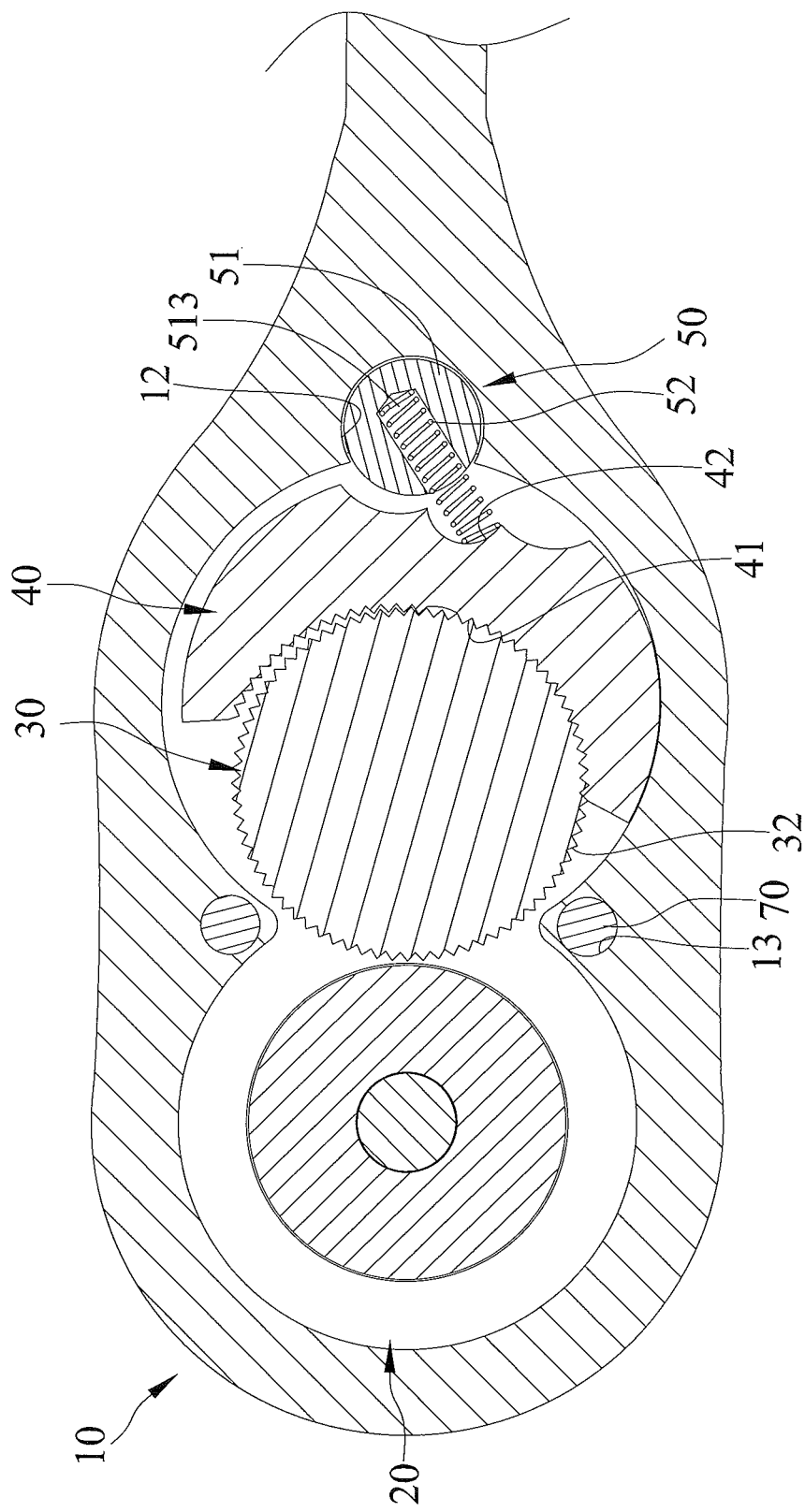
FIG. 6 is a cross-sectional view taken along line 6-6 of FIG. 1.
Figure 7:
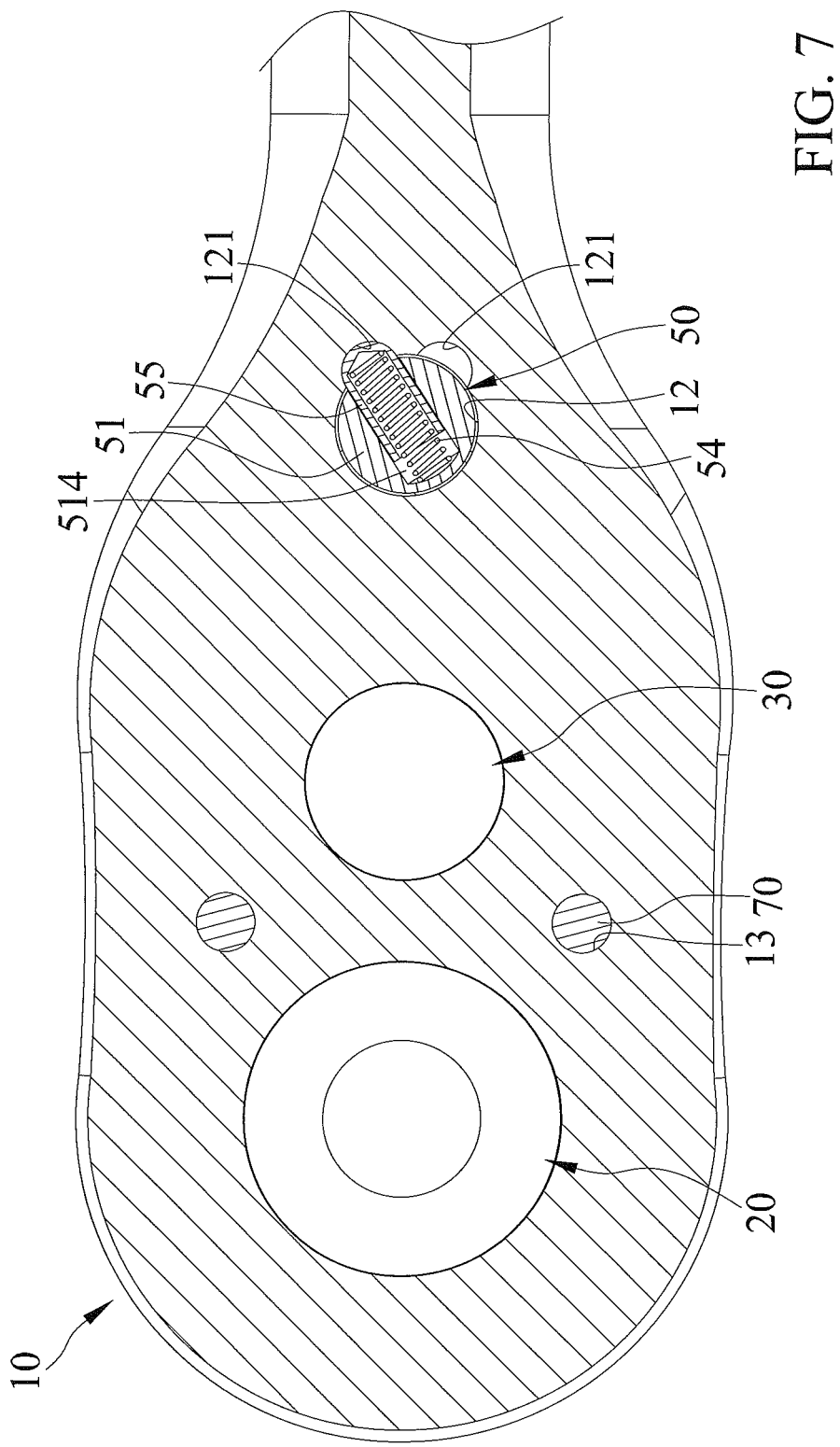
FIG. 7 is a cross-sectional view taken along line 7-7 of FIG. 1.
Figure 8:
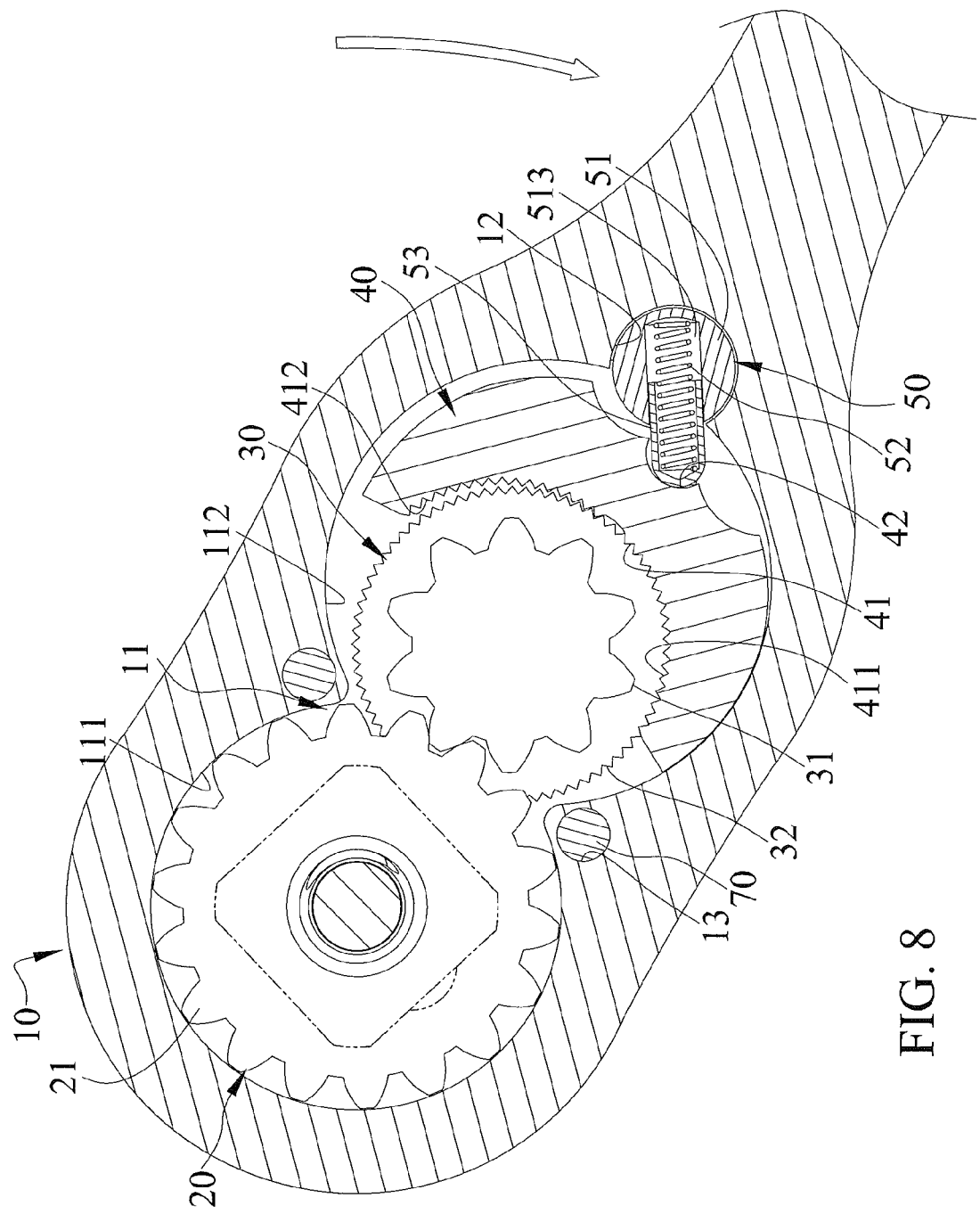
FIG. 8 is a continued cross-sectional view of FIG. 5 and shows the driving end of the tool in a clockwise operation.
Figure 9:
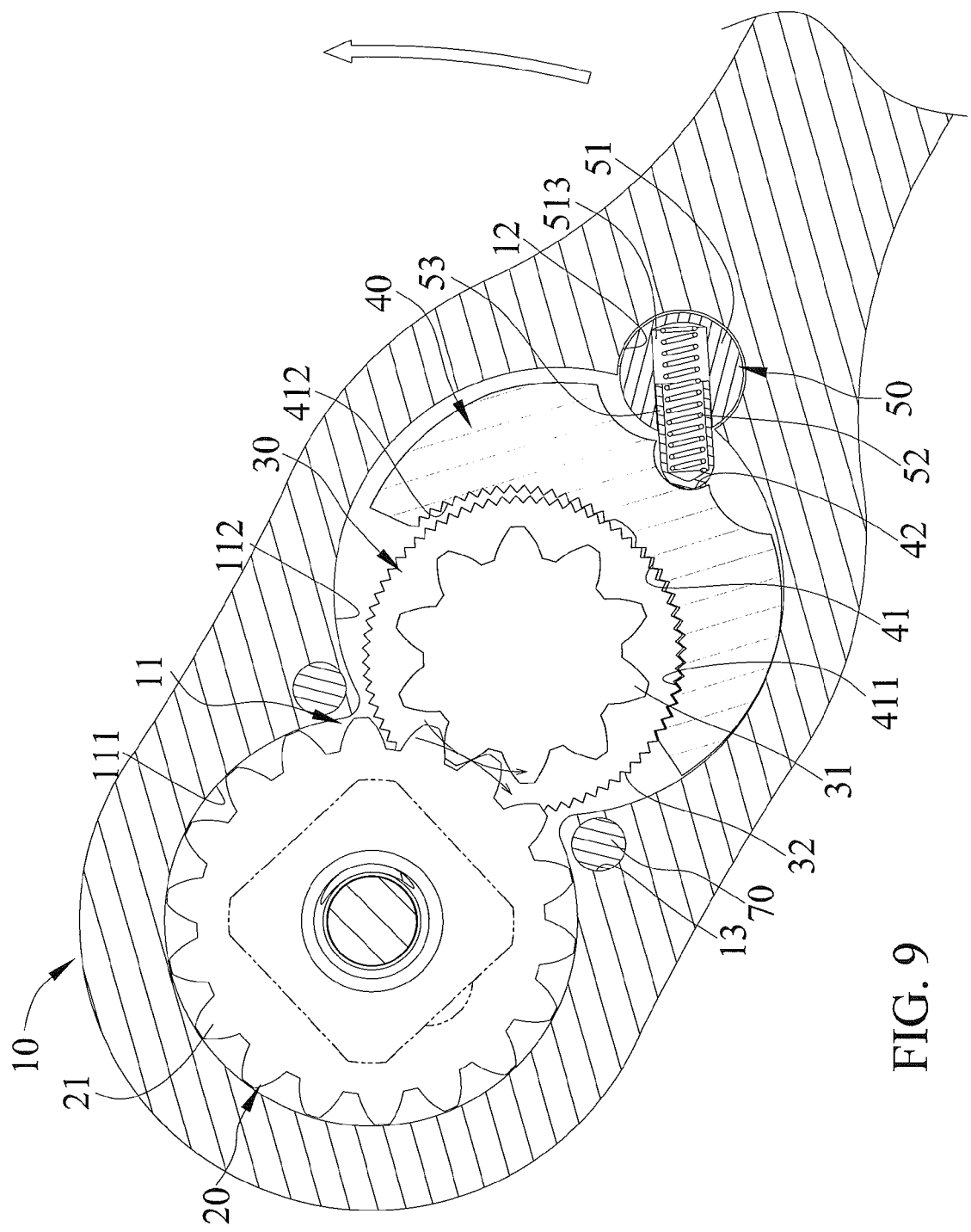
FIG. 9 is a continued cross-sectional view of FIG. 5 and shows the driving end of the tool in a counterclockwise operation.
Figure 10:
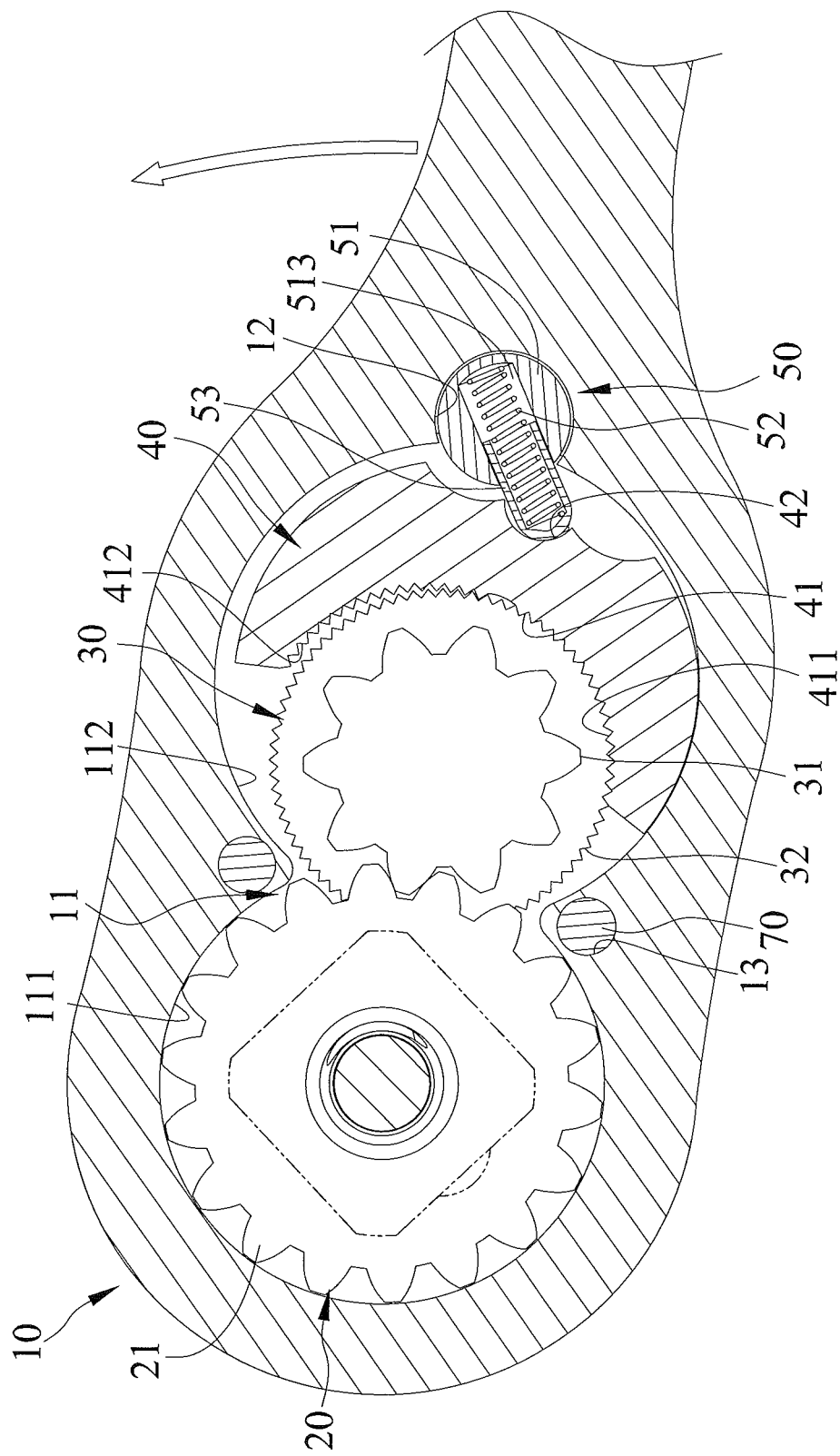
FIG. 10 is a continued view of FIG. 9 and shows the driving end of the tool in the counterclockwise operation.
Figure 11:
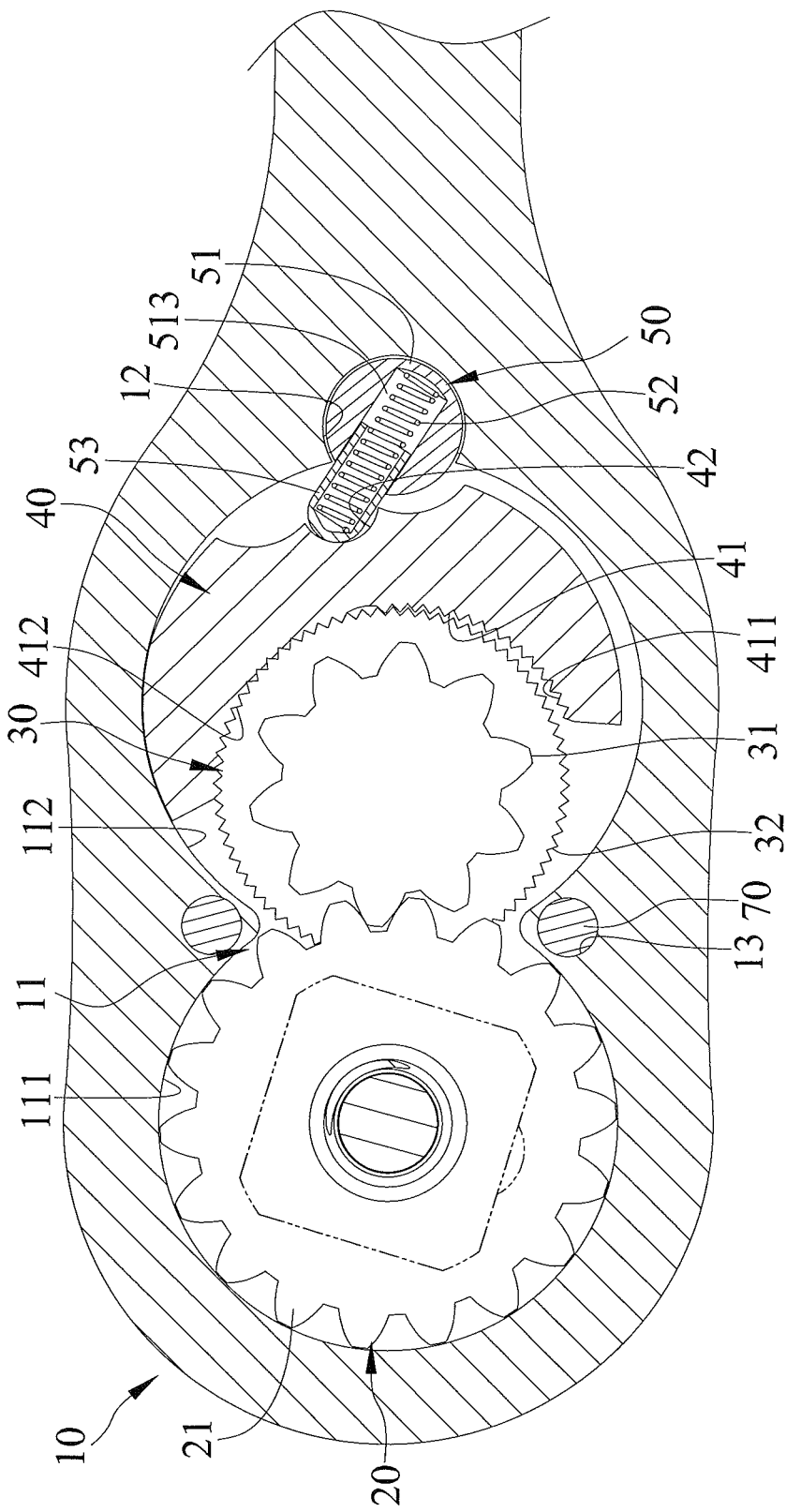
FIG. 11 is a cross-sectional view showing the driving end of the tool in an operation mode different from that of FIG. 5.
Figure 12:
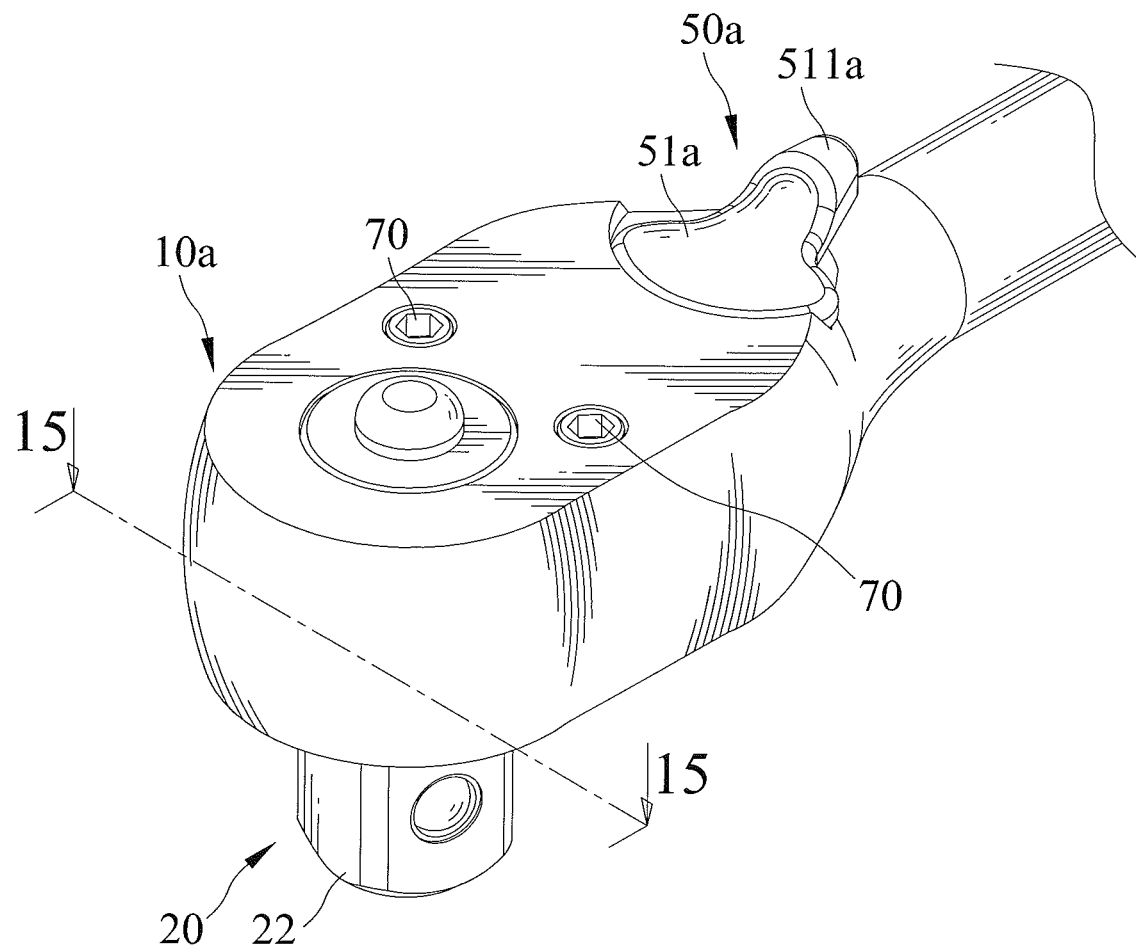
FIG. 12 is a perspective view of a driving end of a tool in accordance with a second embodiment of the present invention.
Figure 13:
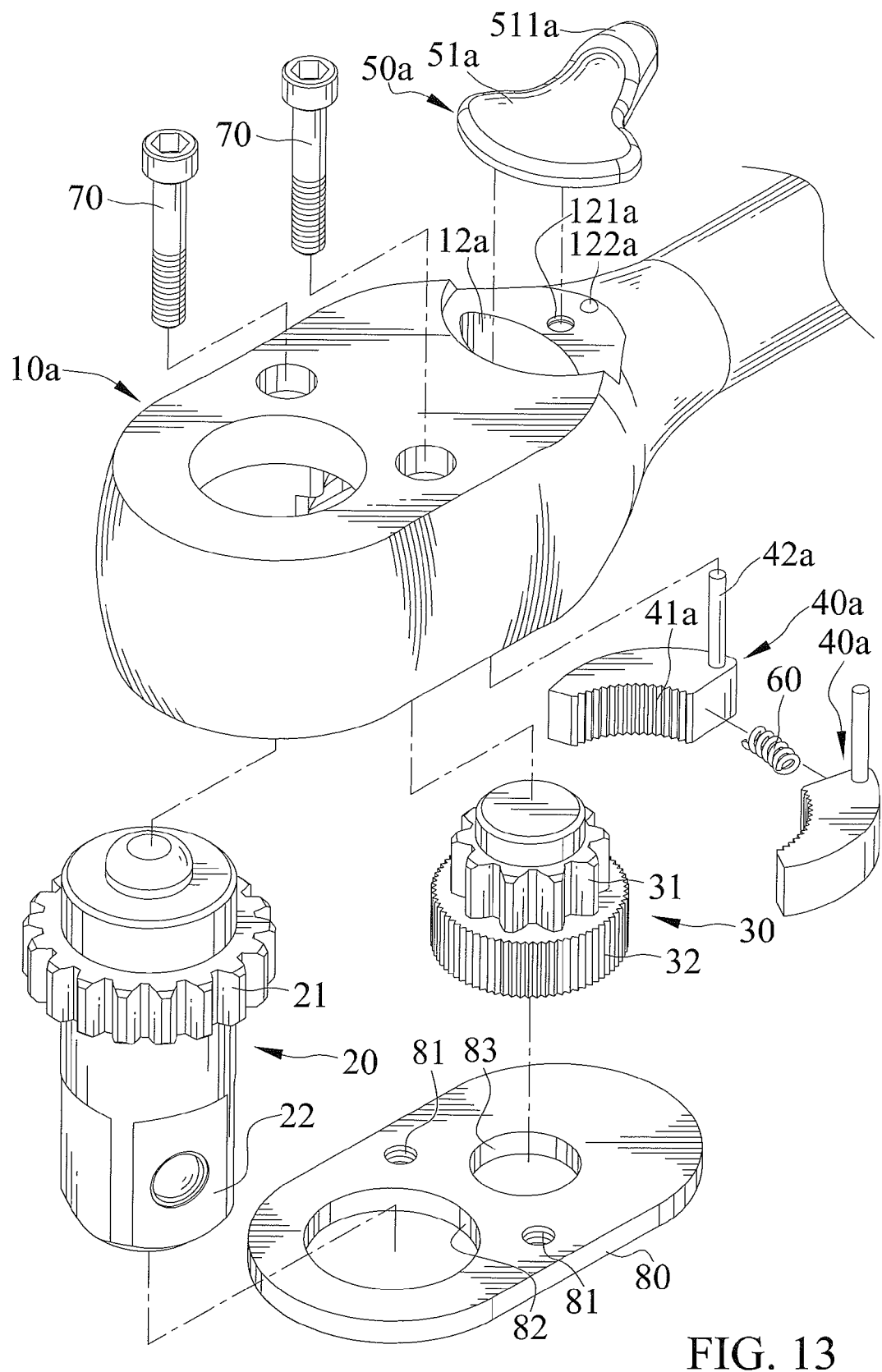
FIG. 13 is an exploded perspective view of the driving end of the tool shown in FIG. 12.
Figure 14:
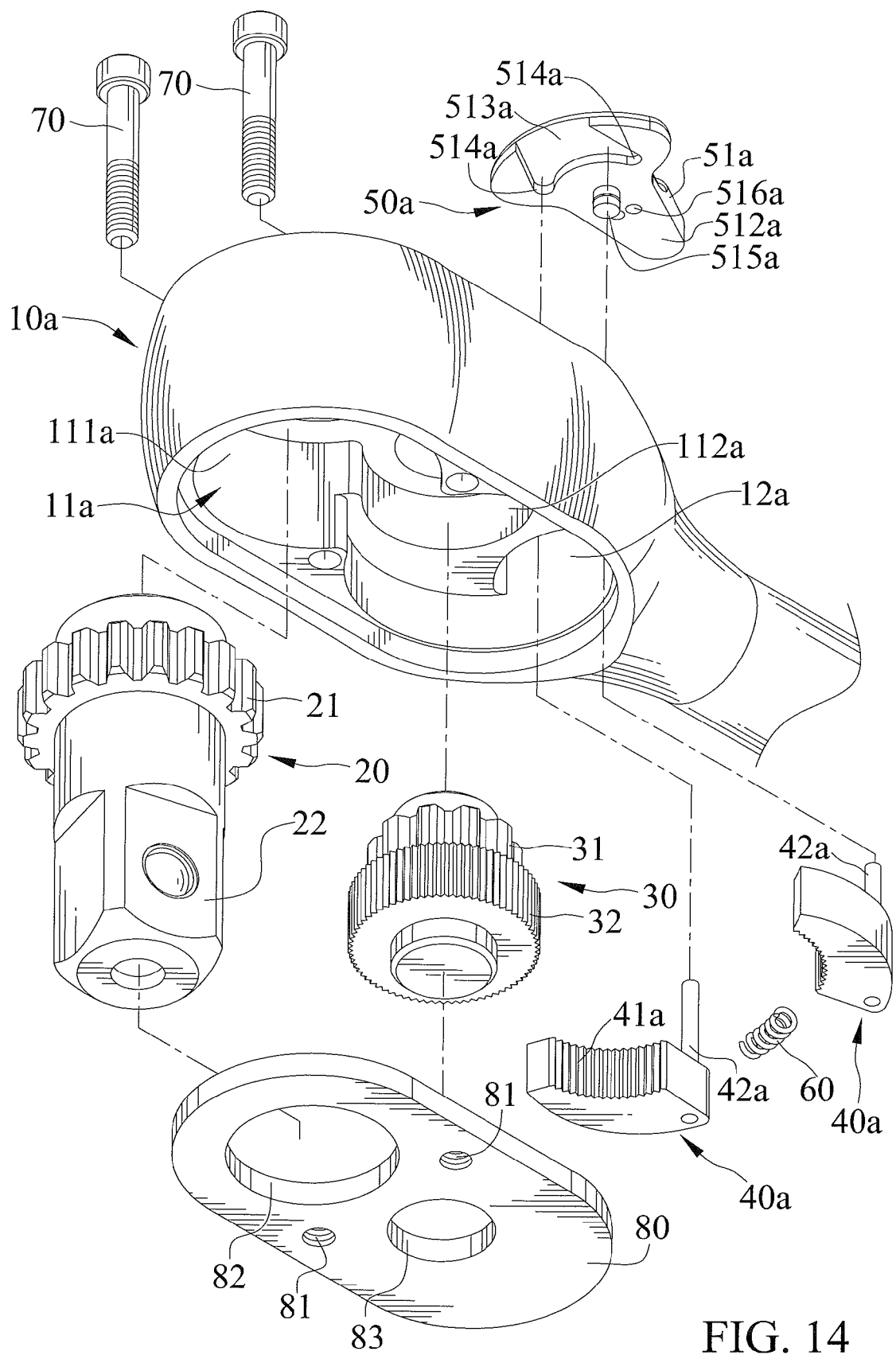
FIG. 14 is another exploded perspective view of the driving end of the tool shown in FIG. 12, taken from a different angle than FIG. 13.
Figure 15:
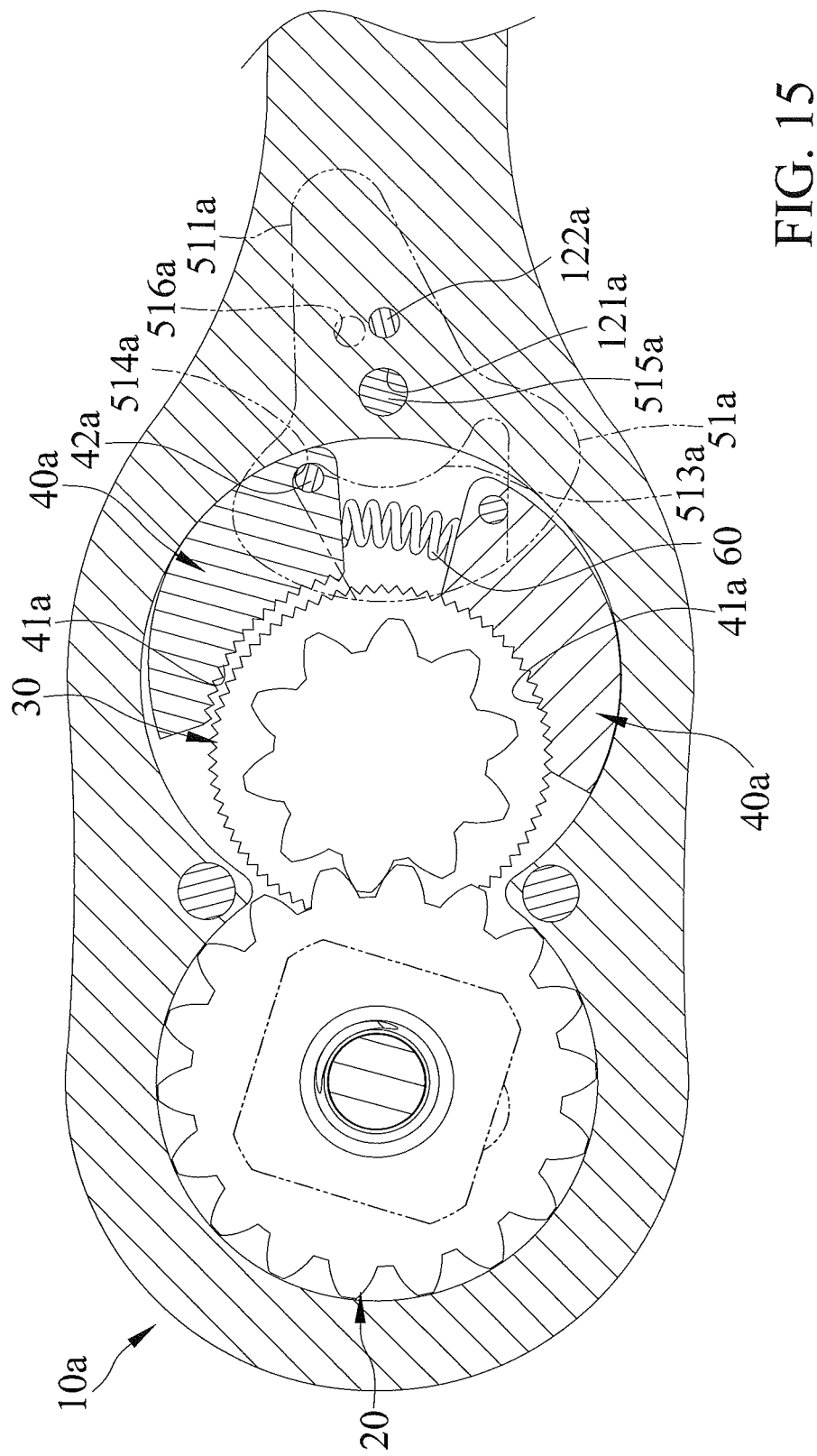
FIG. 15 is a cross-sectional view taken along line 15-15 of FIG. 12.

FIGS. 1 through 11 show a driving end of a tool in accordance with a first embodiment of the present invention.

A body 10 has a first side 101 and a second side 102 opposite the first side 101. A chamber 11 is delimited between the first and second sides 101 and 102. The chamber 11 defines first and second sectional areas 111 and 112. The body 10 includes a bore 12 extending into and in communication with the second sectional area 112. The body 10 also includes at least one first orifices 13 and a second orifice 14 extending therethrough. In the embodiment, the body 10 includes two first orifices 13.

A first engaging member 20 is rotatably disposed in the first sectional area 111 and defines a first engaging section 21. The first engaging section 21 extends circumferentially on an outer periphery of the first engaging member 20. The first engaging section 21 includes a plurality of teeth. The first engaging member 20 also defines a second engaging section 22 for engaging with an object to be driven by the driving end of the tool. The second engaging section 22 includes a stem and a detent mechanism mounted on the stem. In a case that the second engaging section 22 is engaged with an object to be driven by the driving end of the tool, the stem joins the object to be driven and the detent mechanism securing it to the stem. Additionally, the first engaging member 20 includes an input end (not numbered) opposite the detent mechanism for controlling the detent mechanism. The input end is disposed through the second orifice 14 and is exposed outside the chamber 11. Therefore, a user can easily operate the detent mechanism.

A second engaging member 30 is rotatably disposed in the second sectional area 112 and defines first and second engaging ends 31 and 32. The first engaging section 21 is engaged with the first engaging end 31. The first engaging end 31 extends circumferentially on an outer periphery of a first end of the second engaging member 30. The first engaging end 31 includes a plurality of teeth. A pitch between two adjacent teeth of the first engaging section 21 and a pitch between two adjacent teeth of the first engaging end 31 are substantially the same. The second engaging end 32 extends circumferentially on an outer periphery of a second end of the second engaging member 30. The second engaging end 32 includes a plurality of teeth. A pitch between two adjacent teeth of the second engaging end 32 is relatively smaller than that of the first engaging end 31.

At least one pawl 40 is slidably disposed in the second sectional area 112 and defines a first engaging portion 41. The first engaging portion 41 extends arcuately. The first engaging portion 41 includes a plurality of teeth. The first engaging portion 41 is divided into a first sub engaging portion 411 and a second sub engaging portion 412 separate from the first sub engaging portion 411. The second engaging end 32 is selectively engaged with the first engaging portion 41. A pitch between two adjacent teeth of the first engaging portion 41 is substantially the same as that of the second engaging end 32.

The first engaging member 20, the second engaging member 30, and the at least one pawl 40 allow a user to operably move through a small angle to drive an object engaged therewith and the driving end to withstand high torque transmission.

A switch 50 has different positions, depending on different operation modes of the driving end of the tool. The driving end of the tool has two operation modes, and the switch 50 is rotatable about the axis to first and second positions selectively. The switch 50 is pivotally engaged with the body 10 about an axis and abutted against the at least one pawl 40. The switch 50 is engaged with the bore 12. The at least one pawl 40 includes a second engaging portion 42 opposite the first engaging portion 41 engaged with the switch 50. The second engaging portion 42 is in the form of a recess. The switch 50 includes an activating member 51 including a fixing end 511 and a handle end 512 extending from the fixing end 511. The fixing end 511 is engaged with the bore 12. The handle end 512 is exposed outside the bore 12. The fixing end 511 includes an outer periphery thereof including at least one first cavity 513. The at least one first cavity 513 and the second engaging portion 42 include a first biasing element 52 disposed therebetween and engaged therewith. In the embodiment, the fixing end 511 includes two first cavities 513, and one of the first cavities 513 includes the first biasing element 52 engaged therewith biasing a first pusher 53 to engage with the second engaging portion 42. The first biasing element 52 and the first pusher 53 make the at least one pawl 40 engage with the second engaging end 32 effectively. Moreover, a detent has an end engaged with the fixing end 511 and another end engaged with the body 10. The detent facilitates the switch 50 to be releasably fixed in the first and second positions thereof. The body 10 includes two recesses 121 extending therein and into the bore 12, and the fixing end 511 includes the outer periphery thereof including a second cavity 514. The second cavity 514 includes the detent engaged therewith, and the detent is selectively engaged in one of the two recesses 121. The detent includes a second biasing element 54 engaged with the second cavity and a second pusher 55 biased by the second biasing element 54 to engage with one of the recesses 121 selectively. In this embodiment, the two recesses 121 are related to two operation modes of the switch 50.

The chamber 11 includes an opening closed by a cover member 80. The cover member 80 is fixed to the body 10 by at least one fastener 70. The cover member 80 includes a first hole 81 with which the at least one fastener 70 is engaged, a second hole 82 with which a first end of the first engaging member 20 is engaged, and a third hole 83 an end of the second engaging member 30 is engaged. In the embodiment, the driving end of the tool includes two fasteners 70 engaging the cover member 80 with the body 10. The cover member 80 engaged with the body 10 includes two first holes 81 aligned with and corresponding to the two first orifices 13, respectively. The two fasteners 70 are disposed through the two firsts orifices 13 and engaged in the two first holes 81 to secure the cover member 80 to the body 10. The cover member 80 also includes a second hole 82 and a third hole 83 extending therethrough. The second engaging section 22 is disposed through the second hole 82 and disposed outside the chamber 11, and the second hole 82 is aligned with and corresponds to the second orifice 14. The third hole 83 pivotally receives an end of the second engaging member 30. Since the third hole 83 can retain the second engaging member 30, the second engaging member can be stably positioned in the chamber 11.

In a case that the switch 50 is operated to the first position and the driving end of the tool is in a first operation mode and is operated in a first direction, the first and second engaging members 20 and 30 are not rotated, and the second engaging member 30 is engaged with the first sub engaging portion 411 of the at least one pawl 40, and an object engaged with the driving end of the tool is able to be driven in the first direction.

In a case that the switch 50 is operated to the first position and the driving end of the tool is in the first operation mode and is operated in a second direction, which is opposite to the first direction, the first and second engaging members 20 and 30 are being rotated and rotate in opposite directions relative to each other, the second engaging member 30 is engaged with the second sub engaging portion 412 of the at least one pawl 40, and the driving end of the tool is in a freewheel rotation with respect to the object engaged therewith.

In a case that the switch 50 is operated to a second position and the driving end of the tool is in a second operation mode and is operated in the first direction, the first and second engaging members 20 and 30 are being rotated and rotate in opposite directions relative to each other, the second engaging member 30 is engaged with the second sub engaging portion 412 of the at least one pawl 40, and the driving end of the tool is in a freewheel rotation with respect to the object engaged therewith.

In a case that the switch 50 is operated to the second position and the driving end of the tool is in the second operation mode and is operated in the second direction, the first and second engaging members 20 and 30 are not rotated, the second engaging member 30 is engaged with the first sub engaging portion 411 of the at least one pawl 40, and the object engaged with the driving end of the tool is able to be driven in the first direction.

FIGS. 12 through 15 show a driving end of a tool in accordance with a second embodiment of the present invention, and same numbers are used to correlate similar components of the first embodiment, but bearing a letter a. The second embodiment is similar to the first embodiment except a body 10, two pawls 40a, a switch 50, and a biasing member engage the two pawls 40a. The two pawls 40a have shapes symmetrical to each other and are spaced and include the biasing member 60 disposed therebetween and engaged therewith. Each pawl 40a defines a first engaging portion 41a. The first engaging portion 41a extends arcuately. The first engaging portion 41a includes a plurality of teeth. The first engaging portion 41a of one pawl 40a is separate from the first engaging portion 41a of another pawl 40a. Each pawl 40a also defines a second engaging portion 42a engaged with the switch 50a. The second engaging portion 42a extends in the bore 12a. The switch 512a includes an activating member 51a including a fixing end 511a and a handle end 512a extending from the fixing end 511a. The fixing end 511a is engaged in the bore 12a and the handle end 512a is exposed outside the bore 12a. The fixing end 512a includes an outer periphery thereof including a first cavity 51a in which the two second engaging portions 42a are movably disposed and two second cavities 514a in which the two second engaging portions 42a are selectively engaged therewith respectively. One of the body 10a and the switch 50a includes a recess 121a, and the other of the body 10a and the switch 50a includes a protrusion 515a pivotally engaged in the recess 121a. One of the body 10a and the switch 50a includes a protruding member 122a, and the other of the body 10a and the switch 50a includes two receiving areas 516a selectively engaged with the protruding member 122a.

Figure 16:
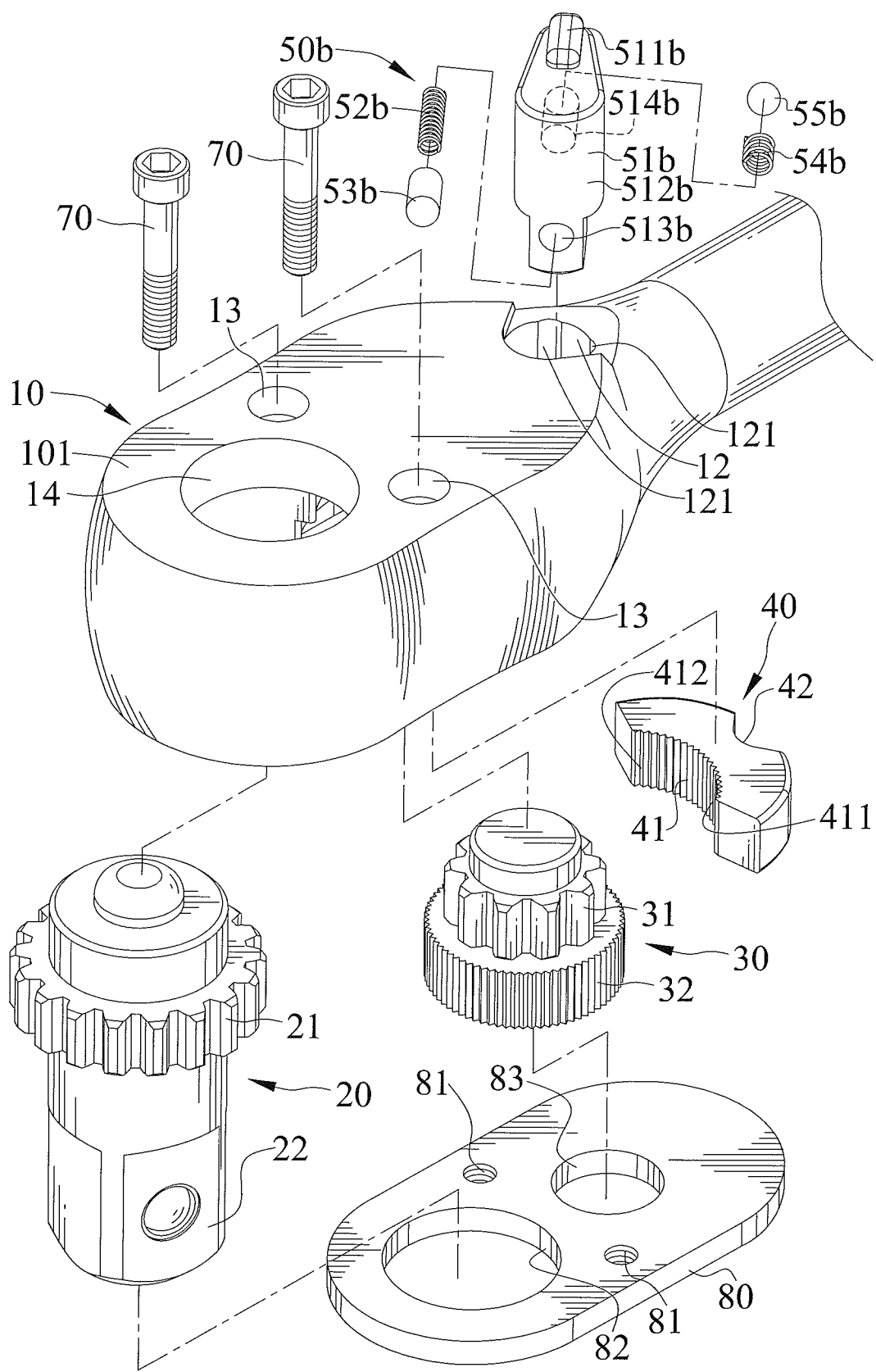
FIG. 16 is a perspective view of a driving end of a tool in accordance with a third embodiment of the present invention.
Figure 17:
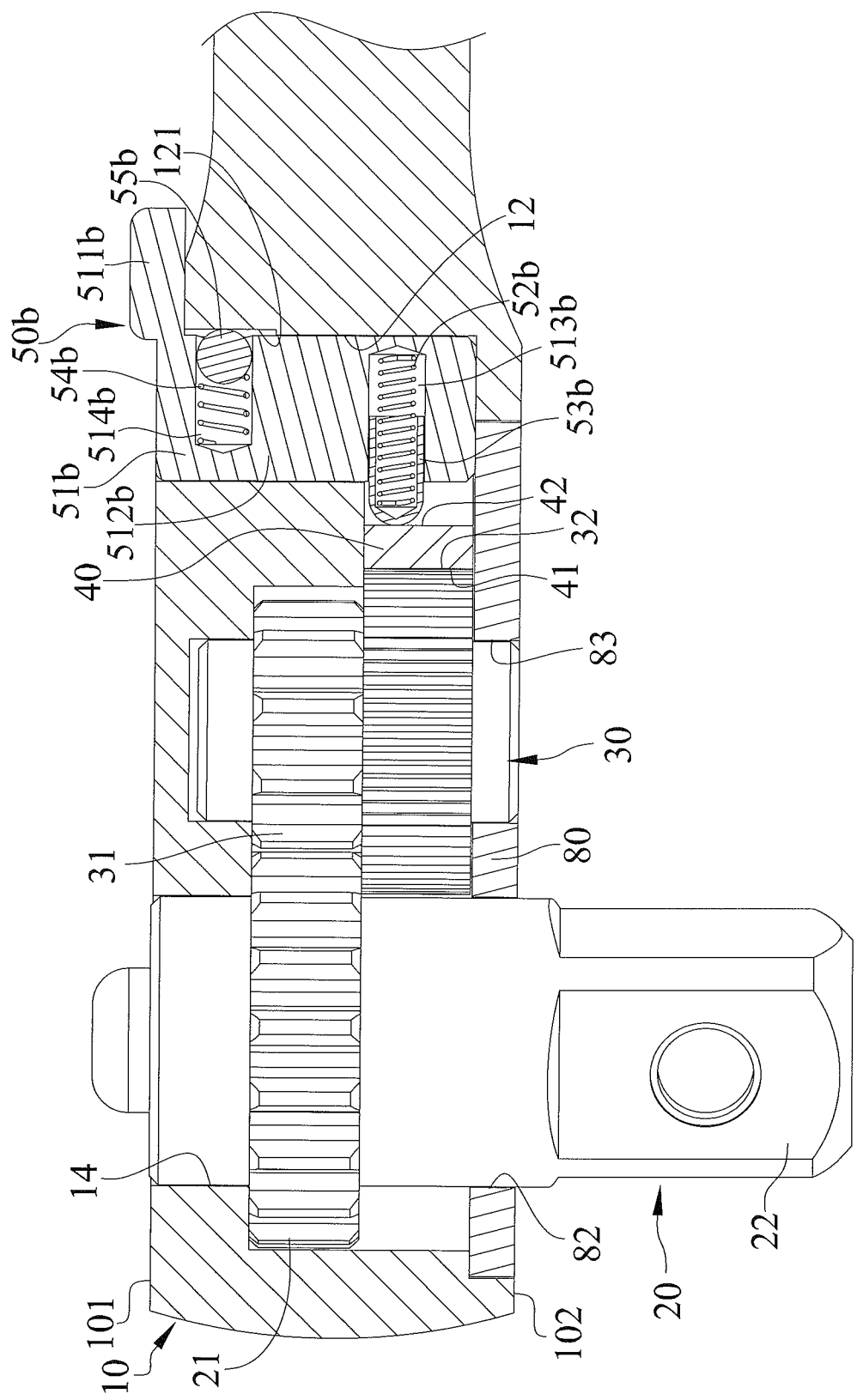
FIG. 17 is a cross-sectional view of the driving end of the tool shown in FIG. 16.

FIGS. 16 and 17 show a driving end of a tool in accordance with a third embodiment of the present invention. The third embodiment is similar to the first embodiment, and same numbers are used to correlate similar components of the first embodiment, but bearing a letter b. The third embodiment is similar to the first embodiment except a switch 50b. The switch 50b includes an activating member 51b including a fixing end 511b and a handle end 512b extending from the fixing end 511b. The fixing end 511b is engaged with the bore 12, and the handle end 512b is exposed outside the bore 12. The fixing end 512b includes an outer periphery thereof including a first cavity 513b. The first cavity 513b and the second engaging portion 42 include a first biasing element 52b disposed therebetween and engaged therewith. A first pusher 53b is biased by the first biasing element 52b to engage with the second engaging portion 42. The first biasing element 52b and the first pusher 53b engage the at least one pawl 40 with the second engaging end 32 effectively. Moreover, a detent has an end engaged with the fixing end 511 and another end engaged with the body 10. The body 10 includes two recesses 121 extending therein and into the bore 12, and the fixing end 51b includes the outer periphery thereof including a second cavity 514b. The second cavity 514b includes the detent engaged therewith, and the detent is selectively engaged in one of the two recesses 121, depending on the operation modes of the switch 50. The detent includes a second biasing element 54b engaged with the second cavity 514b and a second pusher 55b biased by the second biasing element 54b to engage with one of the recesses 121 selectively.

In view of the foregoing, the driving end of the tool has a simple structure, but is able to withstand high torque transmission. Also, a user can operably move through a small angle to drive an object engaged therewith.

While the specific embodiments have been illustrated and described, numerous modifications come to mind without significantly departing from the spirit of invention, and the scope of invention is only limited by the scope of the accompanying claims.

What is claimed is:

1. A driving end of a tool comprising:
   a body including a chamber and a handle fixed relative to the chamber, with the chamber defining first and second sectional areas;
   a first engaging member rotatably disposed in the first sectional area and including two different ends defining a first engaging section and a second engaging section respectively, with the first engaging section extending circumferentially on an outer periphery of the first engaging member and including a plurality of teeth, with the second engaging section engaging with an object to be driven by the driving end of the tool;
   a second engaging member rotatably disposed in the second sectional area and including two different ends defining first and second engaging ends respectively, with the first engaging section engaged with the first engaging end, with the first engaging end extending circumferentially on an outer periphery of a first end of the second engaging member and including a plurality of teeth, with the second engaging end extending circumferentially on an outer periphery of a second end of the second engaging member and including a plurality of teeth, wherein a pitch between two adjacent teeth of the first engaging section and a pitch between two adjacent teeth of the first engaging end are substantially the same, and wherein a pitch between two adjacent teeth of the second engaging end is relatively smaller than that of the first engaging end;
   at least one pawl slidably disposed in the second sectional area and defining a first engaging portion including a plurality of teeth, wherein a pitch between two adjacent teeth of the first engaging portion is substantially the same as that of the second engaging end, with the second engaging end selectively engaged with the first engaging portion; and
   a switch pivotally mounted to the body and abutted against the at least one pawl.

2. The driving end of the tool as claimed in claim 1, wherein the body includes a bore extending into and in communication with the second sectional area.

3. The driving end of the tool as claimed in claim 2, wherein the switch is engaged with the bore, wherein the at least one pawl includes a second engaging portion opposite the first engaging portion engaged with the switch, and wherein the second engaging portion is in the form of a recess.

4. The driving end of the tool as claimed in claim 3, wherein the switch includes an activating member including a fixing end and a handle end extending from the fixing end, wherein the fixing end is engaged with the bore and the handle end is exposed outside the bore, wherein the fixing end includes an outer periphery thereof including at least one first cavity, and wherein the at least one first cavity and the second engaging portion include a first biasing element disposed theretween and engaged therewith.

5. The driving end of the tool as claimed in claim 4, wherein the fixing end includes two first cavities, and wherein one of the first cavity includes the first biasing element engaged therewith biasing a first pusher to engage with the second engaging portion.

6. The driving end of the tool as claimed in claim 4 further comprising a first pusher biased by the first biasing element to engage with the second engaging portion.

7. The driving end of the tool as claimed in claim 4, wherein the body includes two recesses extending therein and into the bore, wherein the fixing end includes the outer periphery thereof including a second cavity, wherein the second cavity includes a detent engaged therewith, and wherein the detent is selectively engaged in one of the two recesses.

8. The driving end of the tool as claimed in claim 5, wherein the body includes two recesses extending therein and into the bore, wherein the fixing end includes the outer periphery thereof including a second cavity, wherein the second cavity includes a detent engaged therewith, and wherein the detent is selectively engaged in one of the two recesses.

9. The driving end of the tool as claimed in claim 7, wherein the detent includes a second biasing element engaged with the second cavity and a second pusher biased by the second biasing element to engage with one of the recesses selectively.

10. The driving end of the tool as claimed in claim 8, wherein the detent includes a second biasing element engaged with the second cavity and a second pusher biased by the second biasing element to engage with one of the recesses selectively.

11. The driving end of the tool as claimed in claim 2, wherein the at least one pawl includes two pawls, wherein the two pawls include a biasing member disposed therebetween and engaged therewith.

12. The driving end of the tool as claimed in claim 11, wherein each pawl includes a second engaging portion engaged with the switch, and wherein the second engaging portion extends in the bore.

13. The driving end of the tool as claimed in claim 12, wherein the switch includes an activating member including a fixing end and a handle end extending from the fixing end, wherein the fixing end is engaged in the bore and the handle end is exposed outside the bore, wherein the fixing end includes an outer periphery thereof including a first cavity in which the two second engaging portions are movably disposed and two second cavities in which the two second engaging portions are selectively engaged therewith respectively.

14. The driving end of the tool as claimed in claim 13, wherein one of the body and switch includes a recess and the other of the body and the switch includes a protrusion pivotally engaged in the recess, and wherein one of the body and the switch includes a protruding member and another of the body and the switch includes two receiving areas selectively engaged with the protruding member.

15. The driving end of the tool as claimed in claim 1, wherein the chamber includes an opening closed by a cover member, and wherein the cover member is fixed to the body by at least one fastener.

16. The driving end of the tool as claimed in claim 15, wherein the cover member includes a first hole with which the at least one fastener is engaged, a second hole with which a first end of the first engaging member is engaged, and a third hole with which an end of the second engaging member is engaged.

17. The driving end of the tool as claimed in claim 1, wherein the plurality of teeth of the at least one pawl is divided into a first sub engaging portion and a second sub engaging portion separated from the first sub engaging portion, with the first and second sub engaging portions selectively engaging with the second engaging member.

* * * * *